(12) United States Patent
Lin et al.

(10) Patent No.: US 8,077,644 B2
(45) Date of Patent: Dec. 13, 2011

(54) DATA TRANSFER IN A COMPUTING DEVICE

(75) Inventors: Jinan Lin, Ottobrunn (DE); Xiaoning Nie, Neubiberg (DE); Ralf Itjeshorst, Walpertskirchen (DE); Tilman Giese, Munich (DE); Xianming Deng, Munich (DE); Denny Brem, Munich (DE); Klaus Mott, Munich (DE); Tideya Kella, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1032 days.

(21) Appl. No.: 11/780,604

(22) Filed: Jul. 20, 2007

(65) Prior Publication Data

US 2009/0022077 A1    Jan. 22, 2009

(51) Int. Cl.
*H04B 7/00* (2006.01)
(52) U.S. Cl. .................................. 370/310; 370/351
(58) Field of Classification Search .................. 370/310, 370/469–473, 510, 512, 351
See application file for complete search history.

(56) References Cited

U.S. PATENT DOCUMENTS

| | | | | |
|---|---|---|---|---|
| 6,052,385 | A  * | 4/2000  | Kanerva et al. | 370/468 |
| 6,496,481 | B1 * | 12/2002 | Wu et al. | 370/242 |
| 6,511,185 | B1 * | 1/2003  | Gananathan | 353/69 |
| 2004/0213284 | A1 * | 10/2004 | Clarke et al. | 370/465 |
| 2005/0262344 | A1   | 11/2005 | Hepler et al. | |
| 2006/0002416 | A1   | 1/2006  | Yagihashi | |
| 2007/0160213 | A1 * | 7/2007  | Un et al. | 380/270 |
| 2008/0267102 | A1 * | 10/2008 | Arunan | 370/310 |
| 2008/0298285 | A1 * | 12/2008 | Ramesh et al. | 370/310 |
| 2009/0125778 | A1 * | 5/2009  | Uchida et al. | 714/749 |

OTHER PUBLICATIONS

ETSI TS 125 321 V5.9.0 (Jun. 2004); *Technical Specification*; Universal Mobile Telecommunications System (UMTS); Medium Access Control (MAC) protocol specification (3GPP TS 25.321 version 5.9.0 Release 5).
ETSI TS 125 322 V5.10.0 (Mar. 2005); *Technical Specification*; Universal Mobile Telecommunications System (UMTS); Radio Link Control (RLC) protocol specification (3GPP TS 25.322 version 5.10.0 Release 5).
ETSI TS 133 102 V5.7.0 (Dec. 2005); *Technical Specification*; Universal Mobile Telecommunications System (UMTS); 3G security; Security architecture (3GPP TS 33.102 version 5.7.0 Release 5).

* cited by examiner

*Primary Examiner* — Cong Tran
(74) *Attorney, Agent, or Firm* — Dickstein Shapiro LLP (57) ABSTRACT

A computing device includes a hardware data processing unit having at least one input buffer, a plurality of output buffers, a data transfer unit, and a software control unit, the data transfer unit configured to transfer data from the input buffer to the plurality of output buffers, and the software control unit configured to control the data transfer unit.

49 Claims, 4 Drawing Sheets

DATA TRANSFER IN A COMPUTING DEVICE

BACKGROUND

The present invention relates to a computing device, a hardware data transfer unit, a software control unit, and a method for performing a data transfer in a computing device.

Conventionally, the protocol stack in UMTS (Universal Mobile Telecommunications System) mobile equipments is mainly implemented in SW (Software) or Firmware running on a microprocessor or a CPU (Central Processing Unit), for reason of a fast time-to-market and of high flexibility against product upgrades and standard changes.

As data rates increase, HW (Hardware) support for some compute-intensive operations (e.g. data movement and encryption) is required. For example, a HW accelerator is known which combines the data mover with a ciphering engine for efficiently performing ciphering calculations while data is being moved from one memory to another.

Conventionally, the SW-based solutions are used to process each sub-layer and to copy the packet data output of each sub-layer to a separate buffer, where the packets waiting for processing at the layer are stored as a whole. For UMTS layer 2 (MAC/RLC) (Media Access Control/Radio Link Control) processing, MAC-hs PDUs (Protocol Data Units) received from HARQ (Hybrid Automatic Repeat Request) are first buffered, waiting for the MAC-hs layer processing, e.g. reordering, by the CPU. After the reordering when a PDU (Packet Data Units) becomes ready to be delivered to the higher layer, i.e., the RLC layer, the payload is disassembled into RLC PDUs and transferred from the MAC-hs (Media Access Control—high speed) buffer into another buffer, where the PDUs wait for RLC processing.

A conventional accelerator is based on such a memory architecture. Usually, it is desired to avoid data buffering as much as possible, since buffers and their management cost silicon, and data movements between buffers affect both performance and energy. One notices that MAC-hs PDUs are of variable length. There thus arises a choice of either using a maximum memory size or a complicated memory control to buffer the MAC-hs PDUs.

In another conventional system, use is made of a single memory for buffering PDU data for both MAC and RLC processing to improve the efficiency of the memory usage. However, this method is basically a HW solution. Due to the expense of a HW memory management, it is only useful for quite simple applications, e.g. with a single SID (Size Index Identifier).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In an embodiment of the invention, the protocol stack implementation of a communication device includes, as an example, at least the following three processing stages
    header parsing (Receive) and editing (Transmit);
    payload data movement; and
    buffer management
Due to profiling of the protocol stack functions it could be ascertained that the main MIPS (Million instructions per second) consumption is dedicated to data movements, header processing and buffer management. Further, data movements represent normally data copy functions; and the header processing and the buffer management represent normally the same state machines with a lot of control logic.

In an embodiment of the invention, the same smart partition of hardware and software for the above functions is proposed to obtain the efficiency through hardware and the flexibility through software.

A data mover can perform data copy, data move and data drop operations in HW with control registers written by SW. The data mover HW processes the data of each packet in two stages. In the first stage, the data mover copies only a part of the packet to the memory and the SW does the analysis of these data. The SW decides whether to drop or move each portion of the packet data and sends the commands to the data mover. The data mover processes the packet data according to the commands in the second stage. Based on the basic approach, a number of possible configurations are proposed to implement the complete MAC (Media Access Control) stack.

The following effects are obtained in accordance with an embodiment of the invention:
    significantly increased throughput to cope with cat 8 HSDPA (Category 8 High Speed Downlink Packet Access);
    very simple HW acceleration circuit to ease the implementation and verification;
    significantly reduced memory and bus accesses, thus also reduced power consumption;
    programmability for header processing to cope with new and changing standards;
    reduced risk to debug and change the more complex logic of e.g. buffer management.

In an embodiment of the invention, the acceleration of the movement and thus the conversion of data of, e.g. a sub-layer in the data-link-layer to data representing e.g. a higher sub-layer of the data link layer is addressed. This is achieved by providing in an embodiment a hardware accelerator and a software control unit. An embodiment of the invention provides therefore a computing device, a software control unit, a hardware data transfer unit, a method for performing a data transfer in a computing device for accelerating the conversion of the data.

Figure 1:
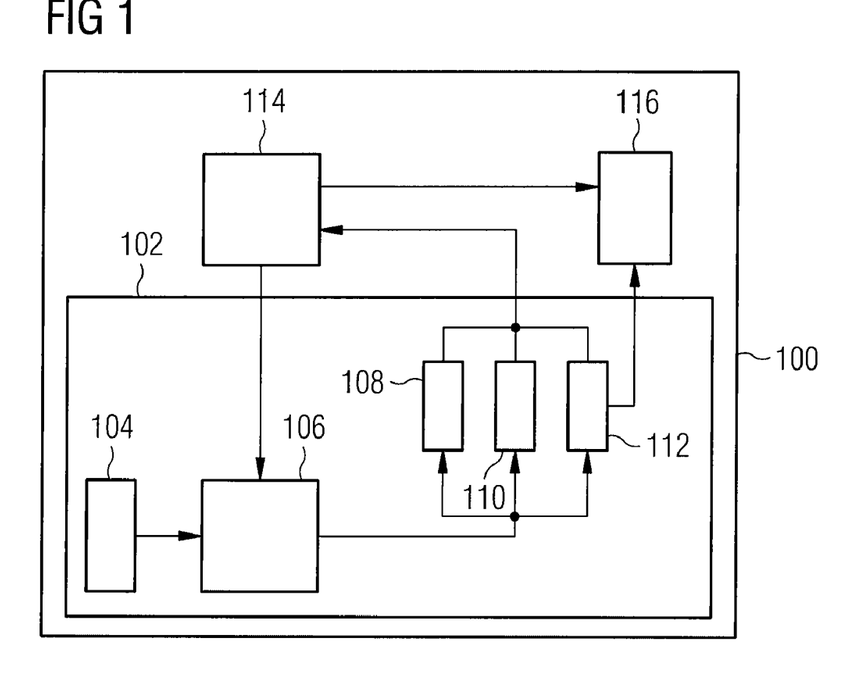
FIG. 1 shows the relation between the main hardware and software components for data conversion acceleration according to an embodiment of the invention.

An embodiment of the invention provides, as shown in FIG. 1, a computing device 100 which contains a hardware data processing unit 102, and a software control unit 114. According to this embodiment, the hardware data processing unit 102 provides at least one data buffer consisting of at least one logical input buffer 104, one logical output buffer 108, 110, 112 and a hardware data transfer unit 106. In the present description, a "logical" buffer means that there is a hardware buffer, such as e.g. a shared or a common buffer, which may be divided into different parts. Each of these parts may be assigned the characteristic to be an input buffer 104 or an output buffer 108, 110, 112. Furthermore each of these input 104 or output buffers 108, 110, 112 may be an allocated memory for a specific task. In this way, the hardware buffer or memory is fixed or dynamically divided into "logical" buffers. In other words, the logical input and output buffers are mapped to the at least one hardware buffer In an embodiment, the hardware data transfer unit 106 is arranged to transfer data from the at least one input buffer 104 to at least one output buffer 108, 110, 112, whereas the software control unit 114 is arranged to control the data transfer unit 106.

According to an embodiment, an accelerated data transfer of data included in a data frame in an logical input buffer 104 and accelerated processing of the data, i.e. disassembling and eventually ciphering or deciphering of the data contained in the frame and providing the resulting data to another instance is provided by a hardware data transfer unit 106 which transfers a first part of the data frame from the logical input buffer 104 to a first 108 of the at least one logical output buffers 108, 110, 112. A software control unit 114 reads a first part of the data frame from the logical output buffer 108 to which the data was transferred to and controls the further transfer operations of the hardware data transfer unit 106 on a second part of the data frame based on information contained in the first part of the data frame. In an embodiment, the second part of the data frame is at least the remaining part of the data frame. As the data transfer unit 106 may not correctly know the size of the relevant first part of the data frame the hardware data transfer unit 106 may, in an embodiment, transfer more data than essentially needed by the software control unit 114 to control the further frame processing. Thus, the second part of the frame transferred by the data transfer unit 106 is at least the remaining part of the data frame.

In an embodiment, the transfer of the first part of the data frame is performed by the hardware control unit 106 according to a pre-configuration. The pre-configuration may e.g. contain a preconfigured bit position and length, or the last bit position in number of bits.

In an embodiment, the memory allocation and the memory deallocation is managed by the software control unit 114.

In a further embodiment, the hardware data transfer unit 106 is micro programmable. In this case, the instructions may be stored in a logical buffer, wherein "logically" means that the buffer is logically associated with the hardware data transfer unit 106, but may physically also be located outside the hardware data transfer unit 106, or be mapped to a shared or common memory.

In an embodiment the software control unit 114 sends micro programs to the hardware data transfer unit 114.

In an embodiment of the invention, the computing device 100 is a communication device, as e.g. a PC (Personal Computer) or a telephone capable of digital connections.

In a further embodiment, the computing device 100 may be a mobile communication device, as e.g. a laptop, notebook or another mobile computing device, capable to establish a connection to another computing device, a mobile telecommunication device, as e.g. a cellular phone or a satellite phone, or a device capable of both, computing and telecommunication, as e.g. PDAs (Personal Digital Assistants). The computing device may communicate according to one or more communication standards as e.g. defined by IEEE (Institute of Electrical and Electronics Engineers; e.g. 802.11), WiMAX (Worldwide Interoperability for Microwave Access), Hyper-LAN (Hyper Local Area Network) or ad-hoc communication standards as e.g. Bluetooth. The cellular phone may for example operate according to a telecommunication standard, as e.g. UMTS (Universal Mobile Telecommunications System), GSM (Global System for Mobile Communications), GPRS (General Packet Radio Service), EDGE (Enhanced Data Rates for GSM Evolution), DECT (Digital Enhanced Cordless Telecommunications), IS-95 (Interim Standard 95), IMT-2000 (International Mobile Telecommunications), PDC (Personal Digital Cellular), I-Mode, FOMA (Freedom of MultiMedia Access), etc. In an embodiment of the invention, the cellular phone may for example operate according to a telecommunication standard in accordance with a $3^{rd}$ Generation Partnership Project (3GPP) telecommunication standard.

In an embodiment, the communication device communicates according to a communication protocol. Communication protocols, as e.g. the ones mentioned above, usually have a protocol stack including different layers.

In an embodiment the data frame is a frame of a layer or a sub-layer of a layer in the protocol stack of the communication protocol.

In a further embodiment, the data frame is a frame of the data link layer.

Figure 2:
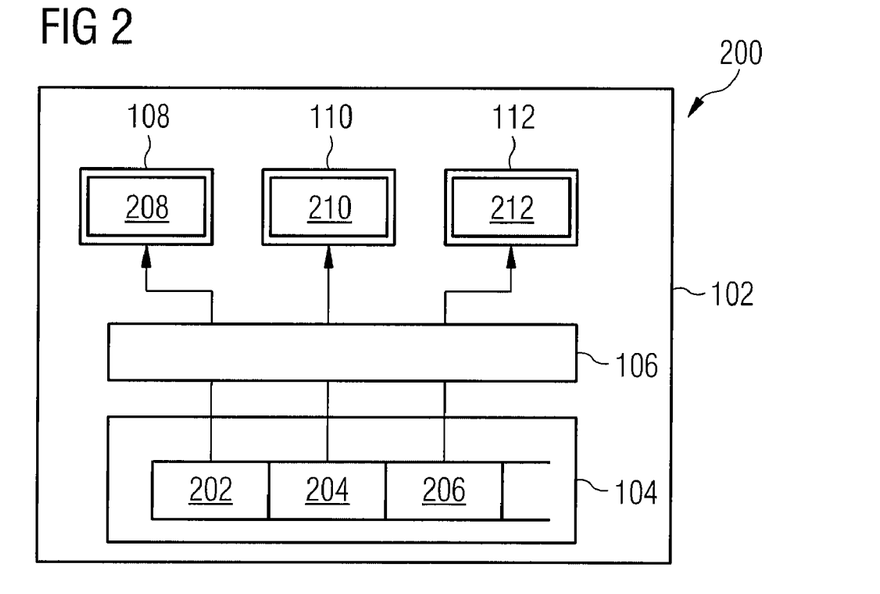
FIG. 2 shows the hardware data transfer unit transferring data from the input buffer to the output buffers according to an embodiment of the invention.

In a further embodiment of the invention, the at least one input buffer 104 is a buffer for sub-layer data 202, 204, 206 of the data link layer, as illustrated in FIG. 2. In this embodiment, the hardware data transfer unit 106 disassembles the sub-layer data 202, 204, 206 of the data link layer at least into data 210, 212 of a higher sub-layer and to transfer the disassembled data 210, 212 into the plurality of output buffers 108, 110, 112. However, alternative embodiments of the invention would also be applicable to one or more other layers in a communication system.

In an embodiment of the invention, the sub-layer data 202, 204, 206 of, e.g., the data link layer data contains header data 202 and payload data 204, 206. In this embodiment, the software control unit 114 is configured to control the data processing unit 102 in accordance with the information in the header data 202 of the sub-layer.

In an embodiment of the invention, the hardware data processing unit 102 is arranged to detect newly arrived sub-layer data 202, 204, 206 in the at least one input buffer 104. According to this embodiment, the hardware data processing unit 102 copies at least the header data 202 of the sub-layer of the data link layer from the at least one input buffer 104 into a first output buffer 108 of the plurality of output buffers 108, 110, 112 and informs the software control unit 114, e.g. by sending an interrupt, about the newly arrived sub-layer data 202, 204, 206.

In an embodiment, the software control unit 114 instructs the hardware data transfer unit 106 to disassemble the payload data 204, 206 of the sub-layer data 202, 204, 206 at least into higher sub-layer header data 210 and into higher sub-layer payload data 212. In this embodiment of the invention, the hardware data transfer unit 106 is arranged to move the header data 210 of the higher sub-layer data into a second output buffer 110 and to move the payload data 212 of the higher sub-layer data into a third output buffer 112.

In an embodiment of the invention, the third output buffer 112 is an external memory. The output buffer may also be an internal memory.

However, as explained in more detail further below, because the access requirements for the access to the higher sub-layer payload data 212 are less restrictive as for the sub-layer header data 208 and higher sub-layer header data 210, it is sufficient and more economic to use an external memory.

In an embodiment of the invention, the hardware data processing unit 102 further contains a cipher unit 116 as depicted in FIG. 1 which is, according to an embodiment, controlled by the software control unit 114 instructing the cipher unit 116 to decipher the higher layer payload data 212.

In an embodiment, the software control unit 114 sends micro programs to the hardware data transfer unit 106.

In an embodiment of the invention, a hardware data transfer unit 106 is provided which contains a data moving unit moving a first part of a data frame from a logical input buffer 104 to a logical output buffer 108, 110, 112; and moving a second part of the data frame according to the control information of the software control unit 114.

In an embodiment, the second part of the data frame contains at least the remaining part of the data frame.

According to a further embodiment, the data moving unit transfers the first part of the data frame according to a pre-configuration. The pre-configuration may e.g. contain a preconfigured bit position and length, or the last bit position in number of bits.

In an embodiment, the hardware data transfer unit 106 contains further a control receive unit receiving control information from a software control unit 114. The control information is based on the information contained in the transferred first part of the data frame.

In an embodiment, the data in the data frame of the hardware data transfer unit 106 is data according to a communication protocol consisting of a protocol stack with a plurality of layers.

In a further embodiment, the data frame is a data frame of the data link of a communication protocol.

In a further embodiment, the hardware data transfer unit 106 further contains a detection unit detecting sub-layer data in the input buffer 104; a copy unit copying at least the header data of the sub-layer of a layer from the logical input buffer 104 into a first logical output buffer 108, 110, 112; and a control send unit informing the software control unit 114 about the sub-layer data.

In a further embodiment, the cipher unit 116 ciphers or deciphers the data during the data transfer or after the data transfer.

In an embodiment of the invention, a software control unit 114 is provided, which contains a receiving unit for receiving a first part of a data frame from a hardware data transfer unit. The software control unit 114 analyzes the information in the received part of the data frame and generates control information for the hardware data transfer unit 106. The generated control information contains information for the hardware data transfer unit 106 how to process a second part of the data frame. The software control unit 114 contains further a control send unit in order to send the control information to the hardware data transfer unit 106.

In an embodiment, the second part of the data frame contains at least the remaining part of the data frame.

In an embodiment of the invention, the software control unit 114 is a part of a communication device, as e.g. a PC or a telephone capable of digital connections. The communication device may be a mobile communication device as, for example, a PDA or a mobile phone. The computing device may operate according to one or more communication standards as e.g. defined by IEEE (e.g. 802.11) or WiMAX, HyperLAN or ad-hoc communication standards as e.g. Bluetooth. The cellular phone may for example operate according to a telecommunication standard, as e.g. UMTS, GSM, GPRS, EDGE, DECT, IS-95, IMT-2000, PDC, I-Mode, FOMA, etc. The computing device 100 communicates for example according to the communication protocols defined in these standards or it may communicate according to any other suitable communication protocol.

In an embodiment, the data frames are frames of the data-link-layer of a communication protocol.

In a further embodiment, the at least one input buffer 104 is, for example, a buffer for sub-layer data 202, 204, 206 of the data link layer as shown in FIG. 2. In this embodiment, the hardware data transfer unit 106 is arranged to disassemble the sub-layer data 202, 204, 206 of the data link layer at least into data 210, 212 of a higher sub-layer and to transfer the disassembled data 210, 212 into the plurality of output buffers 108, 110, 112.

In an embodiment, the sub-layer data 202, 204, 206 of the data link layer contains header data 202 and payload data 204, 206; and the software control unit 114 is configured to control the hardware data processing unit 102 in accordance with the information of the header data 202 of the sub-layer.

In an embodiment, the software control unit 114 is configured to control the data transfer unit 106 to disassemble the payload data 204, 206 of the sub-layer data 202, 204, 206 into higher sub-layer header data 210 and into higher sub-layer payload data 212. The software control unit 114 therefore generates control information for processing the second part of the data frame, which includes information how to disassemble the frame and information how to transfer the data from the logical input buffer 104 to the at least one logical output buffer 108, 110, 112. The transfer control information may e.g. include the information to which of the logical output buffers 108, 110, 112 the disassembled data are to be transferred to.

In an embodiment, the software control unit 114 manages the memory allocation, as e.g. the mapping of the logical input 104 and output buffers 108, 110, 112 to a shared, common or separate memory.

In an embodiment, the hardware data processing unit 102 further contains a cipher unit 116 and the software control unit 114 controls the cipher unit 116 to decipher e.g. the payload data 212 of the higher sub-layer.

In an embodiment, the software control unit 114 controls the cipher unit 116 to cipher and/or decipher data during and/or after the data transfer.

Figure 6:
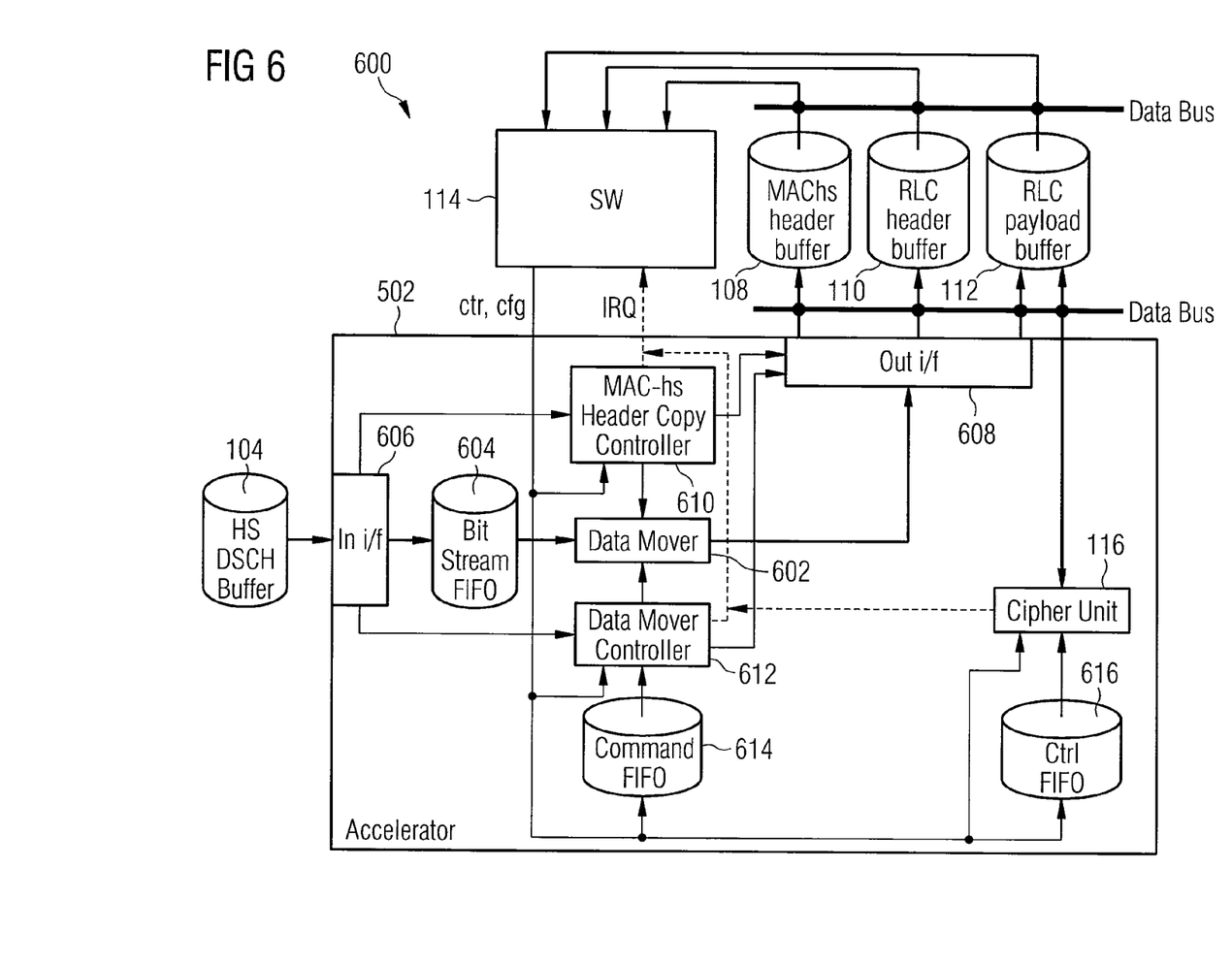
FIG. 6 shows in more detail the data and signal flow and the involved hardware and software units according to an embodiment of the invention.

In an embodiment, the hardware data transfer unit 106 contains at least one controller 610, 612 and a data moving unit 602, as shown in FIG. 6. As explained in more detail further below by means of FIG. 6, the at least one controller 610, 612 may in an exemplary embodiment represent the interface between the software control unit 114 and the data mover 602 and may convert the software commands into hardware commands. The data mover 602 may, for example, copy or move the data coming in from the input buffer 104 via an input interface and a bit stream FIFO 604 to the output buffers 108, 110, 112 via an output interface 608.

Figure 3:
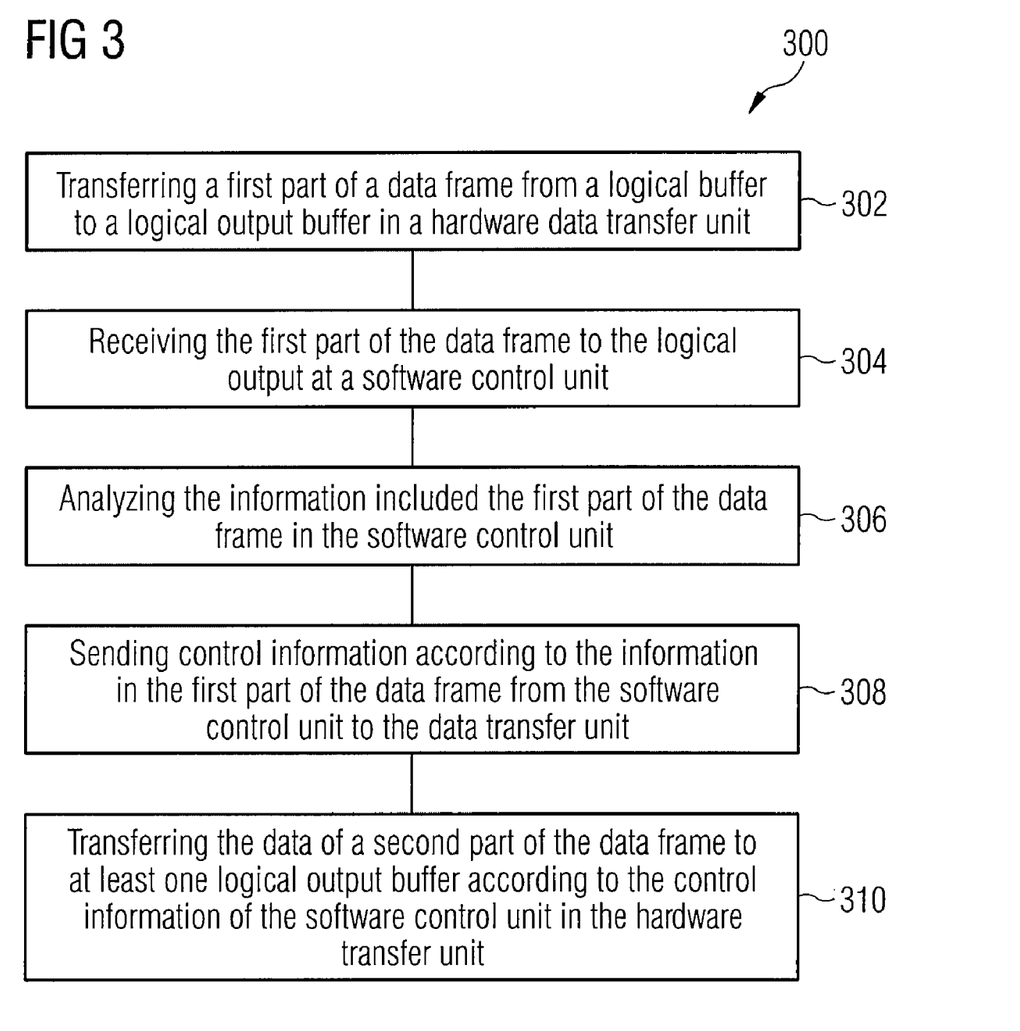
FIG. 3 shows a method for accelerating data conversion using the hard- and software units according to an embodiment of the invention.

In an embodiment the invention, a method is provided for performing a data transfer in a computing device 100. The computing device contains at least one logical input buffer 104, a hardware data transfer unit 106, at least one logical output buffer 108, 110, 112 and a software control unit 114. As depicted in FIG. 3, in 302 a first part of a data frame is transferred from a logical input buffer 104 to a logical output buffer 108, 110, 112 in a hardware data transfer unit 106. In 304, the first part of the data frame is received from the logical output buffer 108 at a software control unit 114. In 306, a software control unit 114 is executed to analyze the data of the first part of the data frame in the first output buffer 108. In 308, the software control unit 114 sends control information according to the results of the analysis of the first part of the data frame to the hardware data transfer unit 106, which then moves in 310 accordingly the data of a second part of from the at least one input buffer 104 into the plurality of output buffers 108, 110, 112.

In an embodiment of the invention, a data movement during protocol stack processing is provided which is fast on the one hand and flexible on the other hand.

In an embodiment, the hardware data transfer unit 106 performs the transfer of the first part of the data frame according to a pre-configuration. The pre-configuration may e.g. contain a preconfigured bit position and length, or the last bit position in number of bits.

In an embodiment, the second part of the data frame contains at least the remaining part of the data frame.

In an embodiment of the method for operating a computing device, the computing device 100 is a communication device, as e.g. a PC or a telephone capable of digital connections. The communication device 100 may be a mobile communication device as, for example, a PDA or a mobile phone. The computing device 100 may communicate according to one or more communication standards as e.g. the standard 802.11 defined by IEEE, WiMAX, HyperLAN or ad-hoc communication standards as e.g. Bluetooth. The cellular phone may for example operate according to a telecommunication standard, as e.g. UMTS, GSM, GPRS, EDGE, DECT, IS-95, IMT-2000, PDC, I-Mode, FOMA, etc. The computing device 100 communicates for example according to the communication protocols defined in these standards or it may communicate according to any other suitable communication protocol.

In an embodiment, the data frames are frames of the data-link-layer of a communication protocol.

In an embodiment of the method, the at least one input buffer 104 is, for example, a buffer for sub-layer data 202, 204, 206 of the data link layer, and the data transfer unit 106 disassembles the payload data 204, 206 of the sub-layer data 202, 204, 206 at least into higher sub-layer header data 210 and into higher sub-layer payload data 212; and the data transfer unit 106 moves the disassembled data 210, 212 into the plurality of output buffers 108, 110, 112.

In an embodiment of the method, the sub-layer data 202, 204, 206 of the data link layer contains header data 202 and payload data 204, 206. In this embodiment, the software control unit 114 controls the data processing unit 102 in accordance with the information of the header data 202 of the sub-layer.

In an embodiment of the method, the hardware data processing unit 102 detects newly arrived sub-layer data 202, 204, 206 in the at least one input buffer 104, copies at least the header data 202 of the sub-layer from the at least one input buffer 104 into a first output buffer 108 of the plurality of output buffers 108, 110, 112, and informs the software control unit 114, e.g. by sending an interrupt, about the newly arrived sub-layer data.

In an embodiment, the hardware data transfer unit 106 moves the header data 202 of the higher sub-layer data into a second logical output buffer 110; and the hardware data transfer unit 106 moves the payload data of the higher sub-layer data into a third logical output buffer 112 according to the control information of the software control unit 114.

In an embodiment of the method, the software control unit 114 configures and pre-configures the data transfer unit 106.

In an embodiment, the software control unit 114 manages the memory allocation and deallocation, e.g. the mapping of the logical input 104 and output buffers 108, 110, 112 to the shared, common or separate memory.

In a further embodiment of the method, the software control unit 114 controls further a cipher unit 116 for ciphering and/or deciphering data contained in the data frame.

In a further embodiment, the software control unit 114 sends micro programs to the hardware data transfer unit 114 and/or the cipher unit 116.

The data-link layer (layer 2) of the UMTS (Universal Mobile Telecommunication System) protocol stack has three sub-layers: Media Access Control (MAC), Radio Link Control (RLC), and Packet Data-Convergence Protocol (PDCP)/GPRS Tunneling Protocol (GTP-U).

The RLC sub-layer is located above the MAC sub-layer for controlling data links. It segments RLC Service Data Units (SDUs) received from the upper layer, into RLC Data Units Packets (PDUs) which fit into the available transport blocks. RLC uses three modes, i.e., the transparent mode (TM), the unacknowledged mode (UM), and the acknowledged mode (AM). In both UM and AM, an RLC header is added to each packet, whereas no RLC header is added to PDUs in TM. UM has no acknowledgment (ACK) signal to send and to receive. AM has to send ACK and receive/process ACK to/from lower layers.

The MAC layer forwards the RLC PDUs to the physical layer (layer 1) for transmission. A MAC header can be added to each RLC PDU byte MAC layer, forming a MAC-d PDU.

Figure 4:
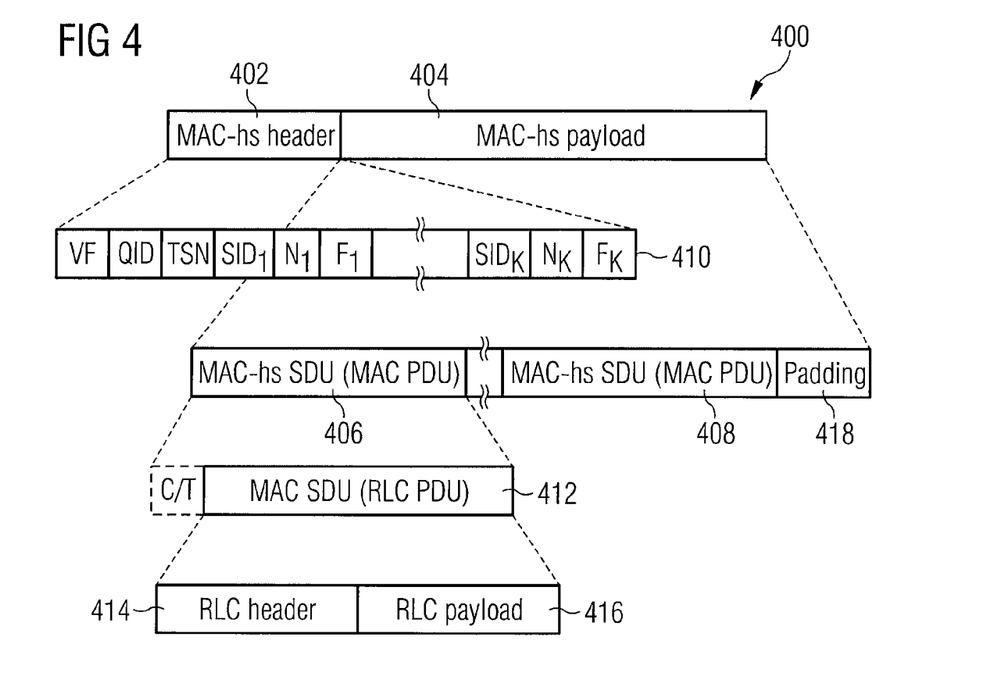
FIG. 4 shows the structure of the UMTS data-link layer.

HSDPA is a part of the UMTS standards, which utilizes enhancement techniques in the physical layer and in the MAC layer to achieve high throughput in the downlink. As depicted in FIG. 4, a MAC PDU 402, 404 of a High Speed Downlink Shared Channel (HS-DSCH), denoted as MAC-hs PDU, can contain multiple groups of MAC-hs SDUs 406, 408 of the same size. Each MAC-hs SDU 406, 408 contains one MAC-d PDU. FIG. 4 illustrates a typical HSDPA PDU.

The fields 410 in MAC-hs header
VF: 1-bit version field (=0);
Q-id: 3-bit queue id;
TSN: 6-bit transmission sequence number;
SID: 3-bit size index identifier of a MAC-hs SDU group;
N: 7-bit number of the MAC-hs SDU group;
F: 1-bit flag set to indicate end of the MAC-hs header Field in MAC-d header;
C/T: 4-bit identity of the logical channel instance when multiple logical channels are carried on the same MAC-d flow (ILS-DSCH).

In the following, the downlink HSDPA layer 2 (MAC/RLC) protocol processing working on the output of the layer-1 HARQ (Hybrid Automatic Repeat Request) processing is considered where the correctness of the channel-decoding of the received data packets has been checked. Typically, the processing of a received MAC-hs PDU 402, 404 (e.g. in AM) includes the following main tasks:

MAC-hs Sub-Layer:
MAC-hs header decoding: The MAC-hs header 402 is parsed into fields 410. From SIDs and Ns the size of each RLC PDUs 412 contained by the MAC-hs PDU 402, 404 is got known.

MAC-hs PDU Reordering:
The MAC-hs PDU 402, 404 is put in queue according to QID where it is reordered according to TSN.

MAC-hs PDU Disassembling:
If the MAC-hs PDU 402, 404 is mature to deliver, its payload is disassembled into RLC PDUs 412 (or MAC-d PDUs 406, 408 if MAC-d multiplexing is configured), which are delivered to the upper layer (RLC or MAC-d).

MAC-d Sub-Layer:

MAC demultiplexing: MAC-d PDUs 406, 408 are demultiplexed, i.e. the payload (a RLC PDU 414, 416) is directed to a logical channel according to C/T.

An embodiment of the invention proposes a method in which a HW module is adopted to accelerate the SW (or Firmware) that runs on a CPU in a mobile equipment (e.g. a mobile phone), processing the HSDPA L2 MAC protocol stack. In an embodiment of the invention, a highly effective acceleration is achieved while retaining the flexibility as well as HW simplicity as much as possible. As a special constraint of mobile equipments, a low power consumption is also taken into consideration.

Figure 5:
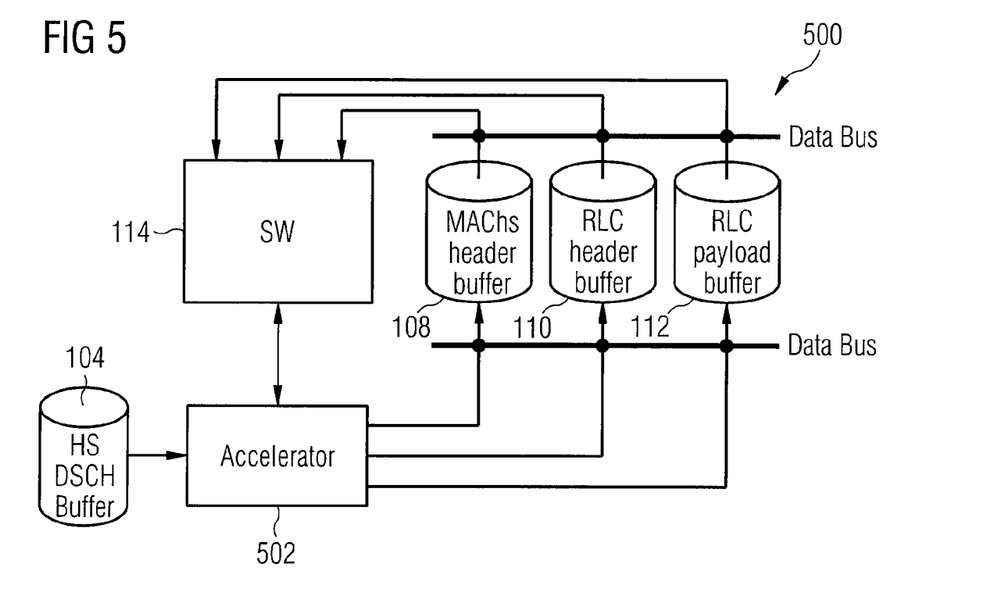
FIG. 5 shows the data and signal flow according to an embodiment of the invention.

FIG. 5 gives an overview of the proposed accelerator 502 used in a system of HSDPA protocol processing. The system performs the MAC processing on MAC-hs PDUs 402, 404 got from the HARQ process. The work is carried out by SW running on a CPU, cooperated by the accelerator 502. An intermediate buffer, HS-DSCH buffer 104, is deployed to buffer the MAC-hs PDUs 402, 404 from the HARQ process. As informed of that a MAC-hs PDU 402, 404 has been processed by the HARQ and put in the buffer, the accelerator first delivers the first N-bytes (with a preconfigured N) to the SW by copying it into the MAC-hs header buffer 108, a buffer within the SW memory-address space. It informs the SW about the renewal of the buffer, e.g. through an interrupt signal or a semaphore. From decoding the information of the first N bytes the SW gets knowledge about all RLC PDUs 412 carried by the MAC-hs PDU 402, 404, i.e. the logical channel, the number of SID groups, the size and the number of the RLC PDUs 421 in each SED group, etc, and can thus reserve (allocate) space in the memory for storing them properly. For processing efficiency, it may allocate two separate memory spaces for buffering the header 414 and payload 416 separately. Whereas the payload buffer 112 may be allocated in a large and slow module (e.g. an extern DRAM) for the sake of cost reduction, the header buffer 110 may be allocated in a smaller and faster memory module (e.g. the CPU data memory or an internal RAM), because the later is accessed by the SW much more frequently. After the memory allocation, the SW sends the addresses along with the size of data that should be stored to those addresses, to the accelerator 502, driving it to move the RLC PDUs 412 from HS-DSCH buffer 104 into the HW memory space, i.e., RLC header buffer 110 and RLC payload buffer 112 for the headers and the payloads, respectively, through a data memory bus, e.g. If ciphering is configured in addition, the accelerator 502 executes deciphering during moving of the payload. One notices that the destination addresses are given with proper alignment in favor of the SW processing. During the data movement the SW can continue the MAC-hs processing, e.g. the reordering. The SW is informed (e.g. through an interrupt signal or a semaphore) after one RLC PDU 412 or a plurality of them has been moved into the memory.

In the following more details about the implementation of the accelerator 502 are considered in an example.

As shown in FIG. 6, the kernel is the data mover 602 which is in charge to transfer data of a given size from the bit stream FIFO (First In First Out) buffer 604 of bit-wise First-In-First-Out, sourcing from HS-DSCH buffer 104 via the input interface 606 (In i/f), to the output buffers 108, 110, 112 in the memory via the output interface 608 (Out i/f). There are three kinds of data transfer, i.e., "data move", "data copy", and "data drop". For a "data move" data transfer, a given number of bits is drained from the FIFO 604 and sent to the destination address. The FIFO 604 is then refilled with the same number of bits from the source (i.e. HS-DSCH buffer 104).

For a "data copy" data transfer, a given number of bits in the bit stream FIFO 604 is reproduced in the destination. No refill happens in the FIFO 604 since no data is drained from it. For a "data copy", a given number of bits is drained from the input FIFO 604 and discarded. "Data drop" is regarded as a special case of "data move" to a void destination. Normally, the data mover 602 is controlled at least by the three parameters: type (move/copy/drop), destination address and length.

The data mover 602 is controlled by two functional blocks, the MAC-hs header copy controller 610 and data move controller 612. The MAC-hs header copy controller 610 is informed by the In i/f (interface) 606 of each MAC-hs PDU 402, 404 newly arriving in the HS-DSCH buffer 104. It gives the data mover 602 a command of copying data of a predefined size that is equal to that maximum possible MAC-hs header size. Meanwhile it drives the Out i/f to direct the output of data mover 602 to the MAC-hs header buffer 108. The reason for copying the MAC-hs header 402 rather than moving it is that the real size of the header is unknown in prior. It is only known after the header has been decoded. After the header has been copied, the controller sets up a signal (an interrupt or a semaphore) to inform the SW of the arrival of the new MAC-hs PDU 402, 404 and the renewal of the header buffer 108.

The data mover controller 612 works on commands given by SW. Each command specifies the size of data to move and the destination address. The cata mover controller 612 passes the data size to data mover 602, triggering it to move the data from bit stream FIFO 604 to the Out i/f 608 and, at the same time, it drives the Out i/f 608 to direct the data to the given address. After the transfer is completed, it may or may not set up a signal (an interrupt or a semaphore) to inform the SW, which is also specified in the SW command. For each MAC-hs PDU 402, 404 received, the very first data mover command is to drop the MAC-hs header 402. The last command is to drop the padding data 418, if there is any. Commands in between are for moving RLC PDUs 412 carried by the MAC-hs PDU 402, 404, i.e. their headers 414 and payloads 416 to RLC Header Buffer 110 and RLC Payload Buffer 112, respectively. The data mover commands can be issued by the SW singly, or in a burst manner. For instance, a burst can include all commands for moving the whole data of a MAC-hs PDU 402, 404, or a SID group of it. A buffer (command FIFO 614) is thus required.

One notices that the payloads 416 are still not deciphered. To do this, a special block, cipher unit 116, is employed. Cipher unit 116 is a ciphering accelerator performing the ciphering algorithm (i.e. the so called f8 algorithm) on a given data block to encrypt or decrypt it. It is controlled by the SW. So long as an RLC header 414 has been decoded and its payload has been moved into RLC payload buffer 112, the SW can send a command consisting of control parameters to cipher unit 116 to decipher the payload 416. Meanwhile, this command specifies the address of the payload as well as the deciphering parameters for it. According to the command the cipher unit 116 takes the data, deciphers it, and sends them back to the memory. The source address and the destination address can be the same (in-place) or different. The cipher unit 116 is regarded as "stand-alone" in the sense that it works on the memory independent of the other blocks in the accelerator 502. It is easy for the resource of the ciphering accelerator to be shared by other processes, i.e. that of uplink ciphering.

This approach has the following effects:

The separate MAC-hs buffer 108 and the RLC buffer 110 in a conventional solution are reduced to a single large buffer for the RLC payloads 416 and two small buffers for the MAC-hs headers 402 and the RLC headers 414.

The data are copied from HARQ only once over the bus rather than twice using a conventional DMA (Direct Memory Access). No extra data copying is necessary between MAC and RLC. Data movements, especially that of the payload 416, are thus reduced significantly.

The payload buffer 112 which is large in size but little accessed by the CPU can be put into an external memory, so that the performance-cost ratio is optimized.

The whole solution is still SW based. While the total performance is improved greatly by offloading the most SW-unfriendly tasks (e.g. data movement with bit-level shift/alignment and data deciphering) to HW, the programmability for control logic (buffer management and header processing) is retained.

An embodiment of the invention represents an option among others for simple HW to implement.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computing device, comprising:
    a hardware data processing unit comprising:
        at least one data buffer comprising at least one logical input buffer and at least one logical output buffer; and
        a hardware data transfer unit; and
    a software control unit configured to process a data frame,
    wherein the at least one logical input buffer contains the data frame, and the hardware data transfer unit is configured to transfer a first part of the data frame from the logical input buffer to the at least one logical output buffer, and
    wherein the software control unit is configured to read the first part of the data frame from a logical output buffer, and to control the further transfer operations of the hardware data transfer unit based on information contained in the first part of the data frame.

2. The computing device according to claim 1, wherein the software control unit is configured to control the further transfer operations of the hardware data transfer unit on a second part of the data frame based on information contained in the first part of the data frame.

3. The computing device according to claim 2, wherein the second part of the data frame is at least the remaining part of the data frame.

4. The computing device according to claim 1, wherein the at least one data buffer is a shared buffer.

5. The computing device according to claim 1, wherein the at least one logical input buffer and the at least one logical output buffer are mapped to at least one data buffer.

6. The computing device of claim 1, wherein the computing device is a communication device.

7. The computing device of claim 6, wherein the communication device is a mobile communication device.

8. The computing device of claim 7,
    wherein the communication device is configured to communicate according to a communication protocol, and
    wherein the data frames comprise sub-layer data of a layer of the communication protocol, the first part of the data frame comprising header data of the sub-layer data, and a second part of the data frame comprising at least payload data of the sub-layer data.

9. The computing device of claim 8, wherein the hardware data transfer unit is configured to:
    detect sub-layer data in the at least one input buffer,
    copy at least the header data of the sub-layer of a layer from the logical input buffer into the logical output buffer, and
    inform the software control unit about the detected and copied sub-layer data.

10. The computing device of claim 1, wherein the hardware data transfer unit is configured to perform the transfer of the first part of the data frame according to a pre-configuration.

11. The computing device of claim 1, wherein the hardware data transfer unit is micro programmable.

12. The computing device of claim 6,
    wherein the payload data of the sub-layer data contains header data and payload data of a higher sub-layer, and
    wherein the hardware data transfer unit is configured to:
    move the header data of the higher sub-layer data into a second logical output buffer according to the control information of the software control unit, and
    move the payload data of the higher sub-layer data into a third logical output buffer according to the control information of the software control unit.

13. The computing device of claim 11, wherein the third logical output buffer is an external memory.

14. The computing device of claim 1, wherein the hardware data processing unit further comprises a cipher unit.

15. The computing device of claim 14, wherein the cipher unit is configured to cipher and/or decipher data during and/or after the data transfer.

16. The computing device of claim 14, wherein the software control unit is further configured to control the cipher unit.

17. The computing device of claim 1, wherein the software control unit is further configured to manage the memory allocation and deallocation.

18. The computing device of claim 1, wherein the software control unit is further configured to configure and pre-configure the data transfer unit.

19. The computing device of claim 1, wherein the software control unit is further configured to send micro programs to the data transfer unit and/or the cipher unit.

20. The computing device of claim 8, wherein the layer is the data link layer of a communication protocol.

21. A hardware data transfer unit, comprising:
    a data moving unit configured to:
    move a first part of a data frame from a logical input buffer to a logical output buffer, and
    move a second part of the data frame according to control information of a software control unit; and
    a control receive unit configured to receive the control information from the software control unit, the control information being based on the information contained in the transferred first part of the data frame.

22. The hardware data transfer unit of claim 21, wherein the second part of the data frame contains at least the remaining part of the data frame.

23. The hardware data transfer unit of claim 21, wherein the data frame comprises sub-layer data of a higher sub-layer according to a communication protocol, the first part of the data frame comprising header data of the sub-layer data, and a second part of the data frame comprising at least payload data of the sub-layer data.

24. The hardware data transfer unit of claim 21 further comprising:
a detection unit configured to detect sub-layer data in the logical input buffer;
a copy unit configured to copy at least the header data of the sub-layer of a layer from the logical input buffer into a first logical output buffer; and
a control send unit configured to inform the software control unit about the sub-layer data.

25. The hardware data transfer unit claim 21, wherein the data moving unit is configured to perform the transfer of the first part of the data frame according to a pre-configuration.

26. The hardware data transfer unit claim 21, wherein the hardware data transfer unit is micro programmable.

27. The hardware data transfer unit claim 23, wherein the hardware data transfer unit is configured to:
move the header data of the higher sub-layer data into a second logical output buffer according to the control information of the software control unit, and
move the payload data of the higher sub-layer data into a third logical output buffer according to the control information of the software control unit.

28. The hardware data transfer unit of claim 24, wherein the layer is the data link layer of a communication protocol.

29. A software control unit configured to receive a first part of a data frame from a hardware data transfer unit, to generate control information based on the data of the first part of the data frame, and to send the control information to the hardware data transfer unit for processing a second part of the data frame, wherein the control information for processing the second part of the data frame comprises:
disassemble-information for frame disassembling; and
transfer information for transferring the data frame from a logical input buffer to at least one logical output buffer.

30. The software control unit of claim 29, wherein the second part of the data frame contains at least the remaining part of the data frame.

31. The software control unit of claim 29, being further configured to configure and pre-configure the hardware data transfer unit.

32. The software control unit of claim 29, being further configured to control a cipher unit configured to cipher and/or decipher data contained in the data frame.

33. The software control unit of claim 32, being further configured to send micro programs to the hardware data transfer unit and/or to the cipher unit.

34. The software control unit of claim 33, being further configured to control the cipher unit to cipher and/or decipher data during and/or after data transfer.

35. The software control unit of claim 29, wherein the data frame is a frame of the data link layer of a communication protocol.

36. The software control unit of claim 29, being further configured to manage memory allocation and de-allocation.

37. A method for performing a data transfer in a computing device, comprising:
transferring a first part of a data frame from a logical input buffer to a logical output buffer in a hardware data transfer unit;
receiving the first part of the data frame from the logical output buffer at a software control unit;
analyzing the information included the first part of the data frame in the software control unit;
sending control information according to the information in the first part of the data frame from the software control unit to the data transfer unit; and
transferring the data of a second part of the data frame to at least one logical output buffer according to the control information of the software control unit in the hardware transfer unit.

38. The method of claim 37, further comprising performing, by the hardware data transfer unit, the transfer of the first part of the data frame according to a pre-configuration.

39. The method of claim 37, wherein the second part of the data frame comprises at least the remaining part of the data frame.

40. The method of claim 37, wherein the computing device communicates according to a communication protocol.

41. The method of claim 40,
wherein the logical input buffer contains sub-layer data of a layer of the communication protocol, and
wherein the method further comprises:
disassembling, by the hardware data transfer unit, the sub-layer data of a layer at least into higher sub-layer data units; and
moving, by the hardware data transfer unit, the disassembled data into a plurality of logical output buffers.

42. The method of claim 41, further comprising:
detecting sub-layer data in the logical input buffer by the hardware data transfer unit;
copying at least the header data of the sub-layer of a layer from the logical input buffer into a first logical output buffer of the plurality of logical output buffers; and
informing the software control unit about the detected and copied sub-layer data.

43. The method of claim 42, further comprising:
moving, by the hardware data transfer unit, the header data of the higher sub-layer data units into a second logical output buffer according to the control information of the software control unit; and
moving, by the hardware data transfer unit, the payload data of the higher sub-layer data into a third logical output buffer according to the control information of the software control unit.

44. The method of claim 41, wherein the layer is the data link layer of a communication protocol.

45. The method of claim 37, further comprising configuring and pre-configuring the data transfer unit by the software control unit.

46. The method of claim 37, further comprising managing the memory allocation and deallocation by the software control unit.

47. The method of claim 37, further comprising controlling, by the software control unit, a cipher unit for ciphering and/or deciphering data contained in the data frame.

48. The method of claim 47, further comprising controlling, by the software control unit, the cipher unit to cipher and/or decipher data during and/or after the data transfer.

49. The method of claim 37, further comprising sending, by the software control unit, micro programs to the hardware data transfer unit and/or the cipher unit.

* * * * *